W. G. C. MASTERSUN.
Water Wheels.
No. 124,755.     Patented March 19, 1872.
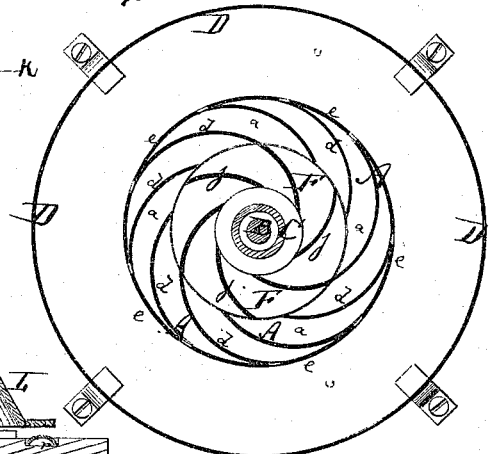
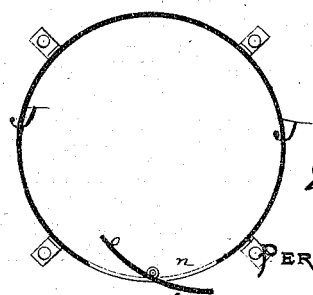
Witnesses:
Chas. Nida
Geo. H. Mabee
Inventor:
W. G. C. Mastersun
per Munn & Co.
Attorneys.

UNITED STATES PATENT OFFICE.

WILLIAM G. C. MASTERSUN, OF PROCTORSVILLE, VERMONT.

IMPROVEMENT IN WATER-WHEELS.

Specification forming part of Letters Patent No. 124,755, dated March 19, 1872.

Specification describing a new and Improved Water-Wheel, invented by WILLIAM G. C. MASTERSUN, of Proctorsville, in the county of Windsor and State of Vermont.

Figure 1 represents a vertical central section of my improved water-wheel. Figs. 2, 3, 4, and 5, are horizontal sections of the same, taken respectively on the lines $c\,c$, $k\,k$, $c\,k$, and $k\,c$, Fig. 1.

Similar letters of reference indicate corresponding parts.

The invention will first be fully described and then clearly pointed out in the claims.

A in the drawing represents the water-wheel. It consists of a bottom plate, $a$, annular top plate $b$, buckets $d\,d$, and rim $e$. By means of the bottom plate $a$ it is mounted upon the lower end of a vertical central shaft, B, which will turn with the wheel. The shaft B extends upward through a long tube, C, which is suspended from the top of a cylindrical case, D, that incloses the entire apparatus. The upper end of the tube C is screwed into a nut, $f$, which rests on a bottom of a cup, E, placed upon the cylinder D. The shaft B passes through this cup E, and carries within the same a collar, $g$, which bears against friction rings $h\,h$ that are placed within the cup, as shown. The upper end of the shaft carries the driving-wheel or pulley $i$. The lower end of the tube C carries the chute F within the wheel A. The chute-plates $j\,j$ run in the same direction as the buckets $d$ of the wheel, and guide the water therefor into the corners that are formed by the buckets $d$ and the rim $e$. There the water will be collected and form elastic cushions, and can only escape through slots in those parts of the rim $e$ which are the greatest distance from the said corners. The water acting on the wheel will thus have water-cushions to bear against, which will cause the motion of the wheel to be steady and quite continuous. Water is conducted to the chute from above by a stationary vertical pipe, G, which is suspended from the top of the case D, and connected with a horizontal entrance-pipe, H. The top plate $b$ of the wheel A has a flange, $l$, which embraces the lower part of the pipe G. From the bottom of the wheel A is suspended an air-vessel, I, terminating below in a semisphere. J is a vertical cylinder, which projects below the wheel A from the bottom $m$ of the case D. Its upper end is open and serves as a support for the wheel when the same is at rest, the float I being in that case suspended into it, as shown. The lower part of the cylinder J has an aperture, $n$, in which there is a pivot-gate, $o$. The lower end of the cylinder D is by short legs or brackets $p\,p$ supported on its bottom $m$, so that openings are formed between the bottom $m$ and the lower end of D for the escape of the water. These openings can be closed by the gate L, which is a ring placed loosely around the lower part of D, and vertically adjustable thereon. The more the ring or gate L is elevated, the larger will be the water-outlet, and the greater therefore the power of a given quantity of water upon the wheel. The gate is made with an upper inwardly-projecting flange, $s$, which will fit on a flange, $p$, of the case D. The body of the gate is made inclined—i. e., outwardly flaring—as in Fig. 1, so that the water may by its own force elevate the gate to a height proportionate to the power of the water. The water ascends, however, in the cylinder J before escaping from the lower part of the case D, and buoys the float I and wheel and shaft in such manner as to support the same, and do away with the use of a step. Thus by having the wheel balanced on water, and at the same time providing within it a series of water-cushions, the motion will be easier, and under more complete control than in any other wheel. $r$ is a rubber ring let into the bottom $m$ for the gate L to rest upon, and close tight when down.

Having thus described my invention, I claim as new, and desire to secure by Letters Patent—

1. The tube C and shaft B combined with cup E, packing $h$, and collar $g$, as described, so as to support the rotary wheel and non-rotary chute independently, but allow both to be raised together by the water.

2. A water-wheel, provided with buckets $d$ and rim $e$, arranged so as to form receptacles beyond the outlet slots of the rim, for water which may serve as a cushion and to steady the motion like a balance-wheel.

3. The combination of a water-supply tube, G, a wheel, *a b e l*, sliding thereon, and provided with float I, a chute, F, and a water-chamber, J, as described, whereby the water passes through wheel A, overflows chamber J, and thereby buoys up the wheel, as set forth.

4. The self-acting gate L, applied around the lower part of case D, as and for the purpose described.

WILLIAM G. C. MASTERSUN.

Witnesses.
 KENDALL TAYLOR,
 GEO. S. HILL.